(12) United States Patent
Malkan et al.

(10) Patent No.: US 12,147,944 B2
(45) Date of Patent: *Nov. 19, 2024

(54) PRODUCT LIFECYCLE MANAGEMENT

(71) Applicant: Rockwell Automation Technologies, Inc., Mayfield Heights, OH (US)

(72) Inventors: Chirag Malkan, Brookfield, WI (US); Kyle Crum, Bayside, WI (US); David Vasko, Hartland, WI (US); Steven T. Haensgen, New Berlin, WI (US); Yutao Wang, Brookfield, WI (US); Bijan SayyarRodsari, Austin, TX (US); Katherine Sokolnicki, Chelmsford, MA (US); Yongyao Cai, Malden, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 547 days.

This patent is subject to a terminal disclaimer.

(21) Appl. No.: 17/469,397

(22) Filed: Sep. 8, 2021

(65) Prior Publication Data

US 2023/0071455 A1 Mar. 9, 2023

(51) Int. Cl.
*G06F 11/30* (2006.01)
*G01M 99/00* (2011.01)
(Continued)

(52) U.S. Cl.
CPC ...... *G06Q 10/0875* (2013.01); *G01M 99/005* (2013.01); *G05B 23/0243* (2013.01);
(Continued)

(58) Field of Classification Search
CPC .................................................. G06Q 10/0875
See application file for complete search history.

(56) References Cited

U.S. PATENT DOCUMENTS

2016/0283443 A1\* 9/2016 Michalscheck .. G05B 19/41875
2020/0103894 A1 4/2020 Cella et al.

OTHER PUBLICATIONS

EPO, European Application No. 22193501.8, Extended European Search Report, dated Feb. 6, 2023, pp. 1-8.

\* cited by examiner

*Primary Examiner* — Phuong Huynh
(74) *Attorney, Agent, or Firm* — Foley & Lardner LLP

(57) ABSTRACT

A method for correlating data from different sensors for product lifecycle management includes receiving sensor information from an additional sensor of a plurality of sensors of an industrial operation. The additional sensor is different from component sensors used for functionality of a component of the industrial operation. Sensor information from the additional sensor monitors conditions of a portion of the industrial operation different from sensor information of the component sensors used for the functionality of the component. The method includes deriving, using the sensor information, a correlation between an operational parameter of the component and sensor information of the additional sensor. The operational parameter is related to a predicted operational lifetime of the component. The method includes identifying an abnormal operating condition of the component based on a comparison between additional sensor information from the additional sensor and the operational parameter, and sending an alert with the abnormal operating condition.

18 Claims, 7 Drawing Sheets

(51) Int. Cl.
  *G05B 23/02*  (2006.01)
  *G06F 16/955*  (2019.01)
  *G06Q 10/0875*  (2023.01)
  *G06Q 30/012*  (2023.01)
  *G07C 3/00*  (2006.01)
(52) U.S. Cl.
  CPC ....... *G05B 23/027* (2013.01); *G06F 16/9558* (2019.01); *G06Q 30/012* (2013.01); *G07C 3/005* (2013.01)

PRODUCT LIFECYCLE MANAGEMENT

BACKGROUND INFORMATION

The subject matter disclosed herein relates to opportunistic sensing and more specifically to use of opportunistic sensor for product lifecycle management. With the proliferation of sensors in components, sensor data is often unused. Opportunistic sensing uses sensor information from sensors in a system.

BRIEF DESCRIPTION

A method for an industrial automation environment for aggregating and correlating data from different types of sensors for product lifecycle management is disclosed. A system and computer program product also perform the functions of the method. The method includes receiving sensor information from an additional sensor of a plurality of sensors of an industrial operation. The additional sensor is different from one or more component sensors of the plurality of sensors used for functionality of a component of the industrial operation. Sensor information from the additional sensor monitors conditions of a portion of the industrial operation different from sensor information of the one or more component sensors used by the component for the functionality of the component. The method includes deriving, using the sensor information, a correlation between an operational parameter of the component and sensor information of the additional sensor. The operational parameter is related to a predicted operational lifetime of the component. The method includes identifying an abnormal operating condition of the component based on a comparison between additional sensor information from the additional sensor and the operational parameter, and sending an alert includes the identified abnormal operating condition.

A system for an industrial automation environment for aggregating and correlating data from different types of sensors for product lifecycle management includes a plurality of sensors of an industrial operation. One or more component sensors of the plurality of sensors provide sensor information for functionality of a component of the industrial operation and an additional sensor of the plurality of sensors provides sensor information to monitor conditions of a portion of the industrial operation different from sensor information of the one or more component sensors used by the component for the functionality of the component. The system includes a sensor module configured to receive sensor information from the plurality of sensors and a correlation module configured to derive, using the sensor information, a correlation between an operational parameter of the component and sensor information of the additional sensor, the operational parameter related to a predicted operational lifetime of the component. The system includes an abnormal condition module configured to identify an abnormal operating condition of the component based on a comparison between additional sensor information from the additional sensor and the operational parameter, and an alert module configured to send an alert that includes the identified abnormal operating condition. The modules include one or more of hardware circuits, a programmable hardware device and executable code where the executable code is stored on one or more computer readable storage media.

A computer program product for an industrial automation environment for aggregating and correlating data from different types of sensors for product lifecycle management includes a computer readable storage medium having program code embodied therein. The program code executable by a processor to receive sensor information from an additional sensor of a plurality of sensors of an industrial operation. The additional sensor is different from one or more component sensors of the plurality of sensors used for functionality of a component of the industrial operation and sensor information from the additional sensor monitors conditions of a portion of the industrial operation different from sensor information of the one or more component sensors used by the component for the functionality of the component. The program code executable by a processor to derive, using the sensor information, a correlation between an operational parameter of the component and sensor information of the additional sensor. The operational parameter is related to a predicted operational lifetime of the component. The program code executable by a processor to identify an abnormal operating condition of the component based on a comparison between additional sensor information from the additional sensor and the operational parameter, and send an alert that includes the identified abnormal operating condition.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
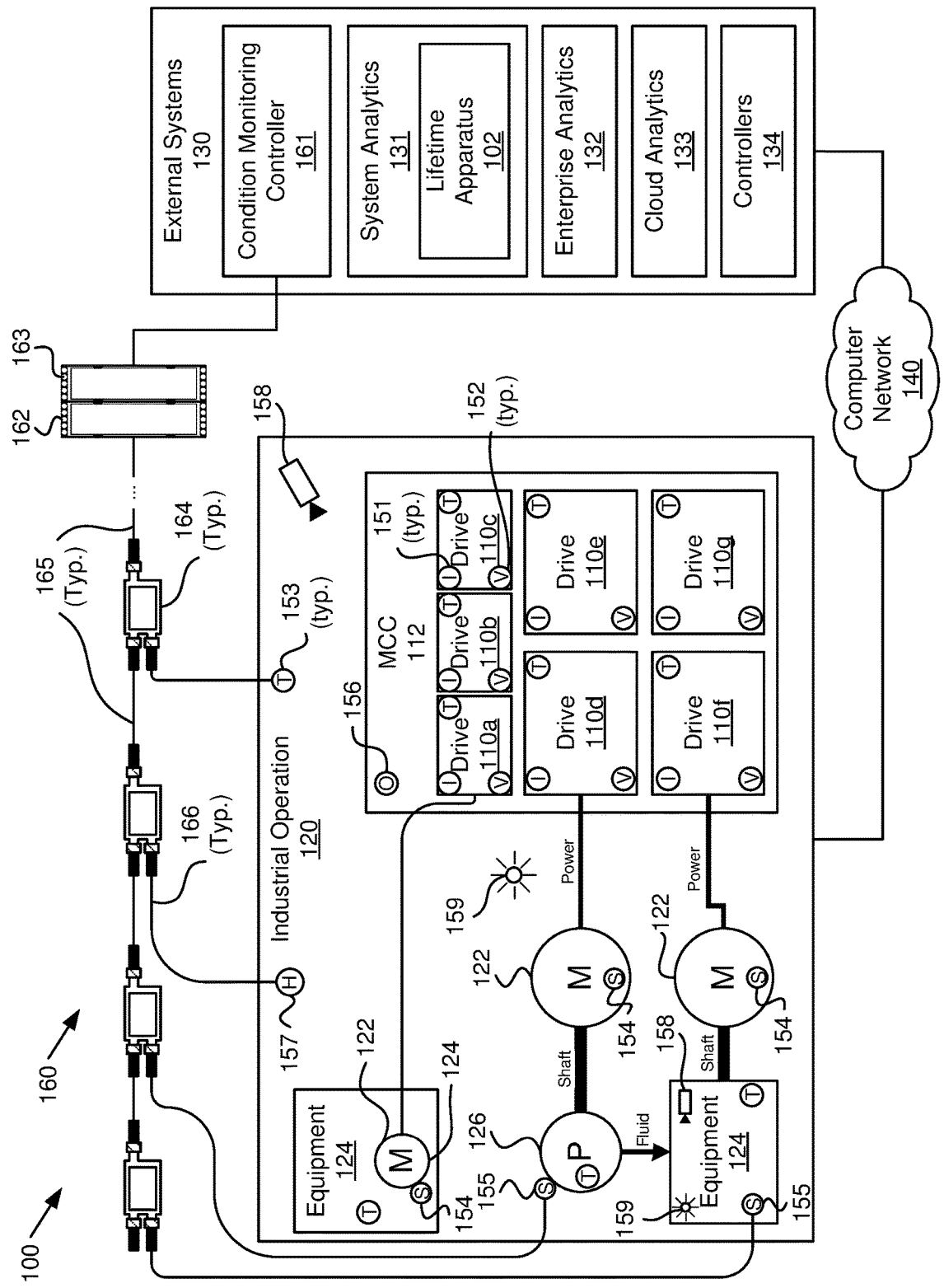
FIG. 1 is a schematic block diagram illustrating one embodiment of an industrial automation environment for aggregating and correlating data from different types of sensors for product lifecycle management.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

A module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like. Modules may also be implemented in program code and/or software for execution by various types of processors. An identified module of program code may include one or more physical or logical blocks of executable code which may be organized as an object, procedure, or function. Executables of a module need not be physically located together.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for an industrial automation environment for aggregating and correlating data from different types of sensors for product lifecycle management is disclosed. A system and computer program product also perform the functions of the method. The method includes receiving sensor information from an additional sensor of a plurality of sensors of an industrial operation. The additional sensor is different from one or more component sensors of the plurality of sensors used for functionality of a component of the industrial operation. Sensor information from the additional sensor monitors conditions of a portion of the industrial operation different from sensor information of the one or more component sensors used by the component for the functionality of the component. The method includes deriving, using the sensor information, a correlation between an operational parameter of the component and sensor information of the additional sensor. The operational parameter is related to a predicted operational lifetime of the component.

The method includes identifying an abnormal operating condition of the component based on a comparison between additional sensor information from the additional sensor and the operational parameter, and sending an alert includes the identified abnormal operating condition.

In some embodiments, sensor information of the additional sensor beyond an operational parameter limit affects the predicted operational lifetime of the component and the method includes using sensor information of the additional sensor beyond the operational parameter limit to modify a predicted operational lifetime model of the component and identifying the abnormal operating condition includes determining, based on the predicted operational lifetime model, that the predicted operational lifetime of the component has reached a lifetime limit. In a further embodiment, the lifetime limit includes a point on the predicted operational lifetime model prior to a predicted failure.

In some embodiments, the operational parameter is a warranty parameter of a warranty of the component and identifying the abnormal operating condition of the component includes identifying that the sensor information from the additional sensor is beyond a warranty limit of the warranty parameter. In other embodiments, the operational parameter affects a warranty parameter of a warranty of the component where the warranty parameter is associated with sensor information of a component sensor of the plurality of sensors and the identifying the abnormal operating condition of the component includes determining that the sensor information from the additional sensor is beyond an operational parameter limit of the operational parameter, adjusting a warranty parameter limit of the warranty parameter in response to determining that the sensor information from the additional sensor is beyond an operational parameter limit of the operational parameter, and determining that sensor information of the component sensor is beyond the adjusted warranty parameter limit.

In some embodiments, deriving the correlation between the operational parameter of the component and sensor information of the additional sensor includes determining that variation of the sensor information of the additional sensor affects the predicted operational lifetime of the component. In other embodiments, deriving the correlation between the operational parameter of the component and sensor information of the additional sensor includes using a machine learning algorithm to identify the correlation from sensor information of a plurality of additional sensors monitoring conditions of a portion of the industrial operation different from the functionality of the component. In other embodiments, the method includes identifying a first use of the component from sensor information of the one or more component sensors and/or the additional sensor. In other embodiments, the method includes using the identified first use of the component to adjust the predicted operational lifetime of the component.

In some embodiments, the method includes identifying, using sensor information from the additional sensor and/or sensor information from the one or more component sensors, one or more operational contexts of the component and identifying the abnormal operating condition of the component further includes identifying an abnormal operating condition of the component using a current operational context of the component and the comparison between the additional sensor information from the additional sensor and the operational parameter. In other embodiments, the method includes deriving a baseline signature from sensor information of the plurality of sensors where the baseline signature encompasses a range of normal operating conditions, and identifying the abnormal operating condition of the component based on the comparison between the additional sensor information from the additional sensor and the operational parameter is in response to determining that the additional sensor information from the additional sensor has exceeded the baseline signature.

In other embodiments, sensor information from the additional sensor and/or the one or more component sensors includes identifying a spectral composition of the sensor information and identifying the abnormal operating condition of the component based on the comparison between the additional sensor information from the additional sensor and the operational parameter includes identifying the abnormal operating condition based on a comparison between a particular frequency range of the additional sensor information from the additional sensor and a corresponding frequency range of the operational parameter. In other embodiments, the plurality of sensors sense one or more of temperature, vibration, current, voltage, motion, acoustic noise, strain, movement, odor, pressure, number of uses of the component, magnetic flux, electromagnetic interference, pH, chemical content in air around the component, and/or humidity. In other embodiments, the alert further includes identification information of the component, a number of spare components to replace the component, a website address for purchase of the component, and/or a link to information about the component.

A system for an industrial automation environment for aggregating and correlating data from different types of sensors for product lifecycle management includes a plurality of sensors of an industrial operation. One or more component sensors of the plurality of sensors provide sensor information for functionality of a component of the industrial operation and an additional sensor of the plurality of sensors provides sensor information to monitor conditions of a portion of the industrial operation different from sensor information of the one or more component sensors used by the component for the functionality of the component. The system includes a sensor module configured to receive sensor information from the plurality of sensors and a correlation module configured to derive, using the sensor information, a correlation between an operational parameter of the component and sensor information of the additional sensor, the operational parameter related to a predicted operational lifetime of the component. The system includes an abnormal condition module configured to identify an abnormal operating condition of the component based on a comparison between additional sensor information from the additional sensor and the operational parameter, and an alert module configured to send an alert that includes the identified abnormal operating condition. The modules include one or more of hardware circuits, a programmable hardware device and executable code where the executable code is stored on one or more computer readable storage media.

In some embodiments, sensor information of the additional sensor beyond an operational parameter limit affects the predicted operational lifetime of the component and the system includes using sensor information of the additional sensor beyond the operational parameter limit to modify a predicted operational lifetime model of the component and the abnormal condition module identifying the abnormal operating condition includes determining, based on the predicted operational lifetime model, that the predicted operational lifetime of the component has reached a lifetime limit. In other embodiments, the operational parameter is a warranty parameter of a warranty of the component and identifying the abnormal operating condition of the component includes identifying that the sensor information from the additional sensor is beyond a warranty limit of the warranty parameter.

In some embodiments, the system includes a machine learning algorithm where deriving the correlation between the operational parameter of the component and sensor information of the additional sensor includes using the machine learning algorithm to identify the correlation from sensor information of a plurality of additional sensors monitoring conditions of a portion of the industrial operation different from the functionality of the component. In other embodiments, the system includes a first use module configured to identify a first use of the component from sensor information of the component sensors and/or the additional sensor.

A computer program product for an industrial automation environment for aggregating and correlating data from different types of sensors for product lifecycle management includes a computer readable storage medium having program code embodied therein. The program code executable by a processor to receive sensor information from an additional sensor of a plurality of sensors of an industrial operation. The additional sensor is different from one or more component sensors of the plurality of sensors used for functionality of a component of the industrial operation and sensor information from the additional sensor monitors conditions of a portion of the industrial operation different from sensor information of the one or more component sensors used by the component for the functionality of the component. The program code executable by a processor to derive, using the sensor information, a correlation between an operational parameter of the component and sensor information of the additional sensor. The operational parameter is related to a predicted operational lifetime of the component. The program code executable by a processor to identify an abnormal operating condition of the component based on a comparison between additional sensor information from the additional sensor and the operational parameter, and send an alert that includes the identified abnormal operating condition.

FIG. 1 is a schematic block diagram illustrating one embodiment of an industrial automation environment 100 for aggregating and correlating data from different types of sensors for product lifecycle management. The industrial automation environment ("environment") 100 includes a lifetime apparatus 102, drives 110a-110g (individually or generically "110") in a motor control center ("MCC") 112, an industrial operation 120, external systems 130, and an external condition monitoring system 160. The industrial operation 120 depicted in FIG. 1 includes machines 122, industrial equipment 124, and a pump 126. External systems 130 include system analytics 131 with the lifetime apparatus 102, enterprise analytics 132, cloud analytics 133, and programmable logic controller ("PLC") automation controllers 134.

The industrial operation 120 represents any industrial machine or system which includes various components, such as machines 122 that are rotating machines, which may be powered by a drive 110. The components of the drive 110, MCC 112 and the industrial operation 120 differ depending on a given implementation and machine type. Systems shown herein typically include additional components, fewer components, and different components and are still in accordance with the technology of the present embodiments. The external systems 130 serve to represent or include any layer of an industrial automation equipment where external analytics collect and analyze data from the industrial operation 120.

The lifetime apparatus 102 receives sensor information from various sensors 151-159 (generically "150") of the industrial automation environment 100 where some of the sensors 150 (component sensors) are used for functionality of a component and additional sensors are for functionality of another component, are placed as more general purpose sensors, are sensors that don't have a specific purpose, etc. The additional sensors may include temperature sensors 153, humidity sensors 157, current sensors 151, etc. The lifetime apparatus 102 repurposes sensor information from the various sensors 150 in an opportunistic sensing application.

The lifetime apparatus 102 derives a correlation between sensor information of at least one additional sensor and an operational parameter of the component being monitored by the component sensors. In some embodiments, the additional sensor being correlated to the operational parameter of the component signifies that sensor information of the additional sensor is related to sensor information of the component sensors and/or to the component (e.g. 110, 112, 122, 124, 126, etc.). For example, a drive 110 may include a current sensor 151 and a voltage sensor 152 as component sensors and the bucket with the drive in the MCC 112 may include a temperature sensor 153 or the MCC 112 enclosure may include a temperature sensor 153 relatively close to the bucket with the drive 110.

In the example, the lifetime apparatus 102 derives a correlation between the temperature sensor 153 and an operational parameter of the drive 110 that is related to a Wow predicted operational lifetime of the drive 110, temperature of the drive 110, input power to the drive 110, output power of the drive 110, output current, etc. A temperature of the drive 110 higher than certain limits may impact the predicted operational lifetime of the drive 110. Likewise, output current above a threshold may also impact the predicted operational lifetime of the drive 110. Power level of the drive 110 may impact also the predicted operational lifetime of the drive 110. High temperature or prolonged high power usage of the drive 110 may reduce the predicted operational lifetime of the drive 110.

The lifetime apparatus 102 identifies an abnormal operating condition based on a comparison between the operational parameter and the sensor information from the additional sensor. For example, the lifetime apparatus 102 may identify from the comparison that the sensor information displays a trend beyond a baseline signature, is beyond a threshold of the operational parameter, or the like. As an example, temperatures of the drive 110 beyond a certain limit may degrade the operational lifetime of the drive 110. Likewise, prolonged power usage of the drive 110 may impact the operational lifetime of the drive 110. Where the lifetime apparatus 102 determines that there is an abnormal condition, the lifetime apparatus 102 sends an alert with the identified abnormal operating condition. The identified abnormal condition in the alert may be used to warn a system administrator, to adjust a curve predicting the operational lifetime of the drive 110, etc. The alert may also be used to take action, such as shut down the drive 110, reduce the load on the drive 110, reduce the speed of a motor driven by the drive 110, etc.

Beneficially, the embodiments described herein provide a way to use opportunistic sensing and take advantage of sensors that are in addition to component sensors that are already present in components to correlate at least one sensor with a component and with an operational parameter of the component where the operational parameter is linked to the operational lifetime of the component. The embodiments described herein provide a mechanism to monitor warranty limits, to adjust a warranty where extreme conditions shorten the expected lifetime of the component, to adjust a predicted operational lifetime of the component, and the like.

In addition, the embodiments described herein may be used to do a root cause failure analysis using real-world data from the sensors instead of data from qualifying lab experiments. The sensor information from the additional sensors can be used along with sensor information from the component sensors to provide physical measurements under actual operating conditions to be used as experimental validation. In other examples, the embodiments described herein could be used where an additional sensor is an electromagnetic interference ("EMI") sensor which could be correlated to data packet loss at an end node of a data network.

Generally, component sensors are used to operate or manage a component of the industrial operation 120. For example, a drive 110 may include current and voltage sensors 151, 152 or other sensors as component sensors used to operate the drive 110. Other additional sensors may be present and may or may not be used for operating the component. For example, a temperature sensor 153 may be used to sense high temperatures in a microcontroller of the drive 110 and may be used to manage the microcontroller but may not be used to control the drive 110. Vibration sensors may be added to a rotating machine 122 controlled by the drive 110 for vibration analysis of bearings and thus may not be used to manage operation of the rotating machine 122 but instead may be used to identify failures. Sensor information may be exported from various components, such as the machine 122, drive 110, etc. to the lifetime apparatus 102. Current and/or voltage sensors 151, 152 may be correlated to various operating parameters of a rotating machine 122, such as low load, full load, overload, may be correlated to various operational parameters such as motor speeds, etc. and sensor information from the sensors 151, 152 may then be used to identify an abnormal operating condition that affects a predicted operational lifetime of the rotating machine 122. Vibration data, temperature data, etc. may also be correlated to an operating parameter of the rotating machine 122.

The industrial operation 120 is depicted with drives 110a-g (e.g. 110) in a motor control center 112 and connected to various devices, such as machines 122 which drive or power equipment 124, pumps 126, etc. The machines 122, in some embodiments, are rotating machines or motors. The equipment 124 includes devices typically found in an industrial operation 120, such as equipment on an assembly line, equipment used for processing raw materials, manufacturing equipment, etc. A pump 126 is depicted and is representative of a device driven by a rotating machine 122. The machines 122, equipment 124, pumps 126 and other devices and/or components in an industrial operation 120 include sensors 150 of various types and for various purposes. In addition, an industrial operation 120 may include other sensors 150 mounted external to the devices of the industrial operation 120, such as temperature sensors 153 to measure ambient temperature, access control sensors, and the like. While an industrial operation 120 is depicted, embodiments described herein may include other environments, such as a data center, or other facility with equipment that include sensors for various purposes and where sensor information is available to be repurposed to identify correlations and trends in the sensor information to identify abnormal conditions.

In embodiments with variable frequency drives ("VFDs") and rotating machines, the drive 110 may be a VFD which supplies power to a rotating machine 122 of the industrial operation 120 while controlling speed of the rotating machine 122 and receives signal data from the industrial operation 120. An analytic engine in a drive 110, in some embodiments, runs a fault detection process to detect faults within the industrial operation 120 based on the signal data. The drives 110 may also be motor starters or other types of motor controllers that are not VFDs.

The industrial automation environment 100, in some embodiments, includes an external condition monitoring system 160 with a condition monitoring controller 161 where the external condition monitoring system 160 is external to equipment 122-126 and drives 110 of the industrial operation 120. The external condition monitoring system 160, in some embodiments, includes a safety relay 162, a network interface 163, connection taps 164, trunk line conductors 165, and tap conductors 166, and may be connected to various devices and sensors 150 for condition monitoring. The condition monitoring may be for safety, for access control, or the like.

In some embodiments, the external condition monitoring system 160 includes a network interface 163 connected to a safety relay 162. The network interface 163 provides a network connection to the condition monitoring controller 161. For example, the external condition monitoring system 160 may include one internet protocol ("IP") address and may be able to provide information from safety devices through the single IP address to the condition monitoring controller 161. Such an arrangement beneficially reduces the number of IP addresses for a plant with one or more industrial operations 120. Other networking interfaces 163 may include more than one IP address, for example, for multiple safety relays 162 or multiple lines from a safety relay 162. In addition to the sensors, the external condition monitoring system 160 may include other safety devices, such as a non-contact switch, a light curtain, a locking switch, an emergency stop, a light curtain, an actuator, a cable pull switch, a key interlock switch, and the like. In other embodiments, one or more sensors 150 and/or safety devices include an IP address. In other embodiments, the external sensors and/or safety devices run on a proprietary network different than an IP network. In other embodiments, the external sensors connect directly to the condition monitoring controller 161.

The industrial automation environment 100 includes various sensors 150 placed for different purposes. The plurality of sensors 150 sense one or more of temperature, vibration, current, voltage, motion, acoustic noise, strain, movement, odor, pressure, number of uses of the component, magnetic flux, electromagnetic interference, pH, chemical content in air around the component, data packet loss and/or humidity. Over time, sensors have become less expensive, and thus equipment of an industrial operation 120 or in an industrial automation environment 100 include more sensors than previous equipment. For example, where traditional starters, drives, etc. have included current and voltage sensors 151, 152, additional sensors may be included, such as temperature sensors 153, vibration sensors, etc. A temperature sensor 153, vibration sensor or other sensor in a starter, drive 110, etc. may be used to monitor device health, abnormal conditions, may be used for feedback and control, etc. In some components, devices, equipment, systems, etc., sensors 150 may be included that do not have a defined purpose.

For example, a device may include a microcontroller that includes various sensors and some of which may not be used in the device but may have been included because the microcontroller includes certain sensors in a standard design. In addition, equipment of an industrial automation environment 100 increasingly are connected to a computer network so that information from the equipment and sensors 150 is available for analysis. Often, equipment of an industrial operation 120 provide so much information that customers are not sure what to do with the information.

Sensor information from the sensors 150 and equipment in the embodiments described herein may be used for opportunistic sensing. Opportunistic sensing takes advantage of available sensor information where the sensor information may then be used for multiple purposes. For example, a drive 110 may use current and voltage sensors for controlling a machine 122, for overload protection, for opening contacts based on overcurrent, etc. Where a temperature sensor 153 is also included in a drive 110, temperature sensor information as an operational parameter affects a predicted operational lifetime of the drive 110 when the temperature is beyond certain limits, is high for a prolonged period of time, etc.

Some of the sensors 150 that may be included in the industrial automation environment 100 include current sensors 151, voltage sensors 152, temperature sensors 153, internal sensors 154 that are integral with components, such as rotating machines 122, external sensors 155 which are external to components and may be added after manufacture or after installation. The internal and external sensors 154, 155 may include vibration sensors, acoustic sensors, and the like. Other sensors 150 that may be included include odor sensors 156, humidity sensors 157, optical sensors 158, motion sensors 159, and the like. While various sensors 150 are depicted in FIG. 1, one of skill in the art will recognize other sensors that may be included in an industrial automation environment 100.

All of the sensors 150 described herein have an ability to export sensor information to the lifetime apparatus 102, such as through the computer network 140. Some sensors 150 are connected directly to the computer network 140, such as through a component in which they are embedded. Other sensors 150 have a wireless connection. Other sensors 150 provide sensor information to another device and the other device exports the sensor data to the computer network 140. For example, a rotating machine 122 may transmit sensor information to a drive 110 and the drive 110 exports the sensor information. While a single line is depicted from the computer network 140 to the industrial operation 120, the single line represents multiple network connections.

The current sensors 151 and voltage sensors 152, in various embodiments, may be embedded in equipment, such as a drive 110, a circuit breaker, a motor starter, etc. and may be used for functionality of the equipment but also have the ability to export sensor information. In other embodiments, the current and voltage sensors 151, 152 are external to the equipment. For example, a current sensor 151 may include a current transformer placed around one or more conductors in the industrial operation 120.

Likewise, the temperature sensors 153 may be internal or external to components. For example, a temperature sensor 153 may be embedded in a microprocessor where sensor information from the temperature sensor 153 may be used to monitor a processor, a core, memory, etc. and the sensor information is also available to be exported for other purposes. Increasingly, the components of an industrial operation 120 include microprocessors, which may include various sensors 150 capable of exporting sensor information. In other embodiments, the temperature sensors 153 are mounted in strategic locations for use by equipment of an industrial operation 120. For example, a temperature sensor 153 may be placed in a workspace, in an enclosure, etc. to monitor ambient temperature conditions. In other embodiments, a temperature sensor 153 may be placed in an enclosure that includes other equipment, such as in a bucket of an MCC 112, but external to a drive 110. One of skill in the art will recognize other locations and uses of a temperature sensors 153.

The internal sensors 154 are described as internal in that the internal sensors 154 are included with components and provide sensor information through communication channels of the components. For example, a machine 122, such as a motor, may include a sensor that transmits sensor information to a drive 110 and the sensor information is then available at the drive 110. The external sensors 155 are described as external in that the external sensors 155 are not integral with the machines 122 and/or drives 110.

The term "external sensor" and "internal sensor" are used merely to connote that the external sensors 155 are connected to the external condition monitoring system 160 or other system and the internal sensors 154 are built into machines 122 or other components and may provide sensor information to the drives 110 and "internal" versus "external" are not used herein to describe actual location of the sensors 154, 155 with respect to components. In some embodiments, sensor information from the external sensors 155 complement sensor information from the internal sensors 154 and may facilitate locating an abnormal operating condition. For example, vibration data from an external vibration sensor 155 in a pump 126 along with vibration data from an internal sensor 154 in a connected machine 122 may be used to determine if the source of the vibration is in the pump 126 or machine 122. The internal and external sensors 154, 155 may be any type of sensor 150. Note that "sensor 150" includes other sensors not specifically depicted in FIG. 1.

In some embodiments, the industrial automation environment 100 includes one or more internal or external sensors 154, 155 which are vibration sensors located in various equipment (e.g. 125, 126) of the industrial operation 120. The vibration sensors, in some embodiments, are positioned to detect vibration in bearings, bearing races, belts, gears, and the like, to detect cavitation in the pump 126 or other potential sources of vibration. In other embodiments, the external condition monitoring system 160 includes acoustic sensors to detect sound caused by vibration or other problem noises. In some embodiments, the acoustic sensors can be used to detect vibrations. For example, an acoustic sensor may be used to detect vibrations associated with various modes of bearing failure, such as bearings in a rotating machine 122. Some vibrations are in the 20-40 kHz range or even higher and an acoustic sensor may be useful to detect the higher frequency vibrations. One of skill in the art will recognize other equipment and locations in the industrial operation 120 to monitor with a vibration sensor, acoustic sensors, etc. The vibration sensors may be accelerometers, may be piezoelectric sensors, such as integrated circuit piezoelectric ("ICP") industrial accelerators, etc. In some embodiments, the sensors 150 are dual output sensors, which may measure two parameters such as vibration and temperature.

In some embodiments, the industrial automation environment 100 includes an odor sensor 156. Odor sensors 156 are smell sensors and are becoming increasingly popular and may be used for a variety of reasons. For example, an odor sensor 156 may be used to detect a smell or odors associated with burning, overheating, or other abnormal condition. Odor sensors 156 may be strategically placed in a drive 110, a MCC 112, equipment 124 or within the industrial operation 120 and may be used for a specific purpose for equipment. In other embodiments, an odor sensor 156 may detect all odors and patterns may be detected, such as high current for a long time, and may correlated with certain sensed odors. In addition, the sensor information from an odor sensor 156 may be exported for use with the lifetime apparatus 102.

In some embodiments, the industrial automation environment 100 includes one or more humidity sensors 157 to monitor humidity in or around the industrial operation 120. In other embodiments, the external condition monitoring system 160 includes one or more temperature sensors 153 to monitor temperature in or around the industrial operation 120. In other embodiment, one or more temperature sensors 153 are located inside equipment. Abnormal temperature may increase equipment failures. In other embodiments, the external condition monitoring system 160 includes other sensors 150, such as chemical sensors, to monitor conditions in the industrial operation 120. One of skill in the art will recognize other sensors 150 useful by the lifetime apparatus 102 to predict abnormal conditions.

In some embodiments, the industrial automation environment 100 includes one or more optical sensors 158. Optical sensors 158 include various types of sensors, such as cameras, sensors that detect a break in a beam of light, and the like. For example, a camera may detect motion, may detect personnel, may detect movement of equipment such as a forklift, etc., which is helpful in determining where certain vibrations are coming from, when personnel are affecting a machine, etc. A beam detector may be used to determine when personnel have opened a compartment, etc. A beam detector may be used to detect smoke or other airborne particles. The optical sensors 158 thus are helpful in determining abnormal conditions as well as when normal operations are being affected so that derivation of a baseline signature may be halted until normal conditions occur.

In some embodiments, the industrial automation environment 100 includes one or more motion sensors 159. The motion sensors 159, in some embodiments, detect motion of any type in a particular location. In other embodiments, the motion sensors 159 detect motion, direction, velocity, etc. in a three-dimensional space, which can be useful in determining if personnel or equipment is moving towards equipment 124, machines 122, etc. The motion sensors 159 may also be correlated to an operating parameter tied to operational lifetime. For example, abnormal movement of a component may decrease the predicted operational lifetime of the component.

The external systems 130 are depicted outside the industrial operation 120 to signify that information from the MCC 112, drives 110, machines 122, equipment 124, pumps 126, external condition monitoring system 160, etc. export information. In some embodiments, the external systems 130 are located at a different site than the industrial operation 120. In other embodiments, the external systems 130 are collocated with the components of the industrial operation 120 and external condition monitoring system 160. Typically, the external systems 130 provide higher level control and analysis not available in the components of the industrial operation 120 and external condition monitoring system 160. In some embodiments, the external systems 130 have higher computing capabilities than many of the component of the industrial operation 120 and external condition monitoring system 160.

The drives 110, in some embodiments, include an analytics engine. While the analytics engine may be in communication with any analytics system of the external systems 130, for some types of faults/failures the analytics engine does not require external systems 130 to perform fault analysis. The analytics engine uses sensor information from the drive 110 and/or machine 122 to determine that a fault or failure has occurred and information about certain faults or failures is fed to the external systems 130. In some embodiments, the raw sensor information is also made available past the analytics engine to the lifetime apparatus 102.

In some examples, an enterprise may use the analytic engine as one component of a greater condition monitoring and analysis system within the enterprise. In other embodiments, the lifetime apparatus 102 uses raw sensor information from the drives 110 or machine 122. A modular topology may utilize the analytic engine at the device level in addition to processes and analyses performed at the system and enterprise level, such as condition monitoring by the external condition monitoring system 160. At the device level, the analytic engine may collect data from internal sensors 154 of devices of the industrial operation 120 and other sources in various formats.

The analytics engine may use collected data to perform condition monitoring, power and energy monitoring, predicted life analysis, load characterization, or similar analyses. At the system level, system analytics 131 may aggregate and contextualize information to detect system level fault conditions and/or provide insights related to preventative maintenance, energy diagnostics, system modeling, performance optimization, and similar insights. The lifetime apparatus 102, in some embodiments, furthers functionality of the system analytics 131.

At the enterprise level, enterprise analytics 132, cloud analytics 133, or a combination thereof may work together with the lifetime apparatus 102 to present information to users on devices and systems including mobile devices and desktop computers to enable remote learning, machine learning, and root cause analysis. Specifically, the lifetime apparatus 102 may use information from the analytic engine and from the condition monitoring controller 161 to predict and detect abnormal conditions, such as impending failures. In FIG. 1 the lifetime apparatus 102 is depicted in the system analytics 131, but may reside in the enterprise analytics 132, condition monitoring controller 161, a server, a cloud computing environment, or other convenient location.

The computer network 140 may be wired, wireless or a combination of both. The computer network 140 may include a local area network ("LAN"), a wide area network ("WAN"), a fiber optic network, a proprietary network, the Internet, a wireless connection, and/or the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® (IrDA®). Alternatively, the wireless connection may include a cellular telephone network communication. All standards and/or connection types include the latest version and revision of the standard and/or connection type as of the filing date of this application.

Figure 2:
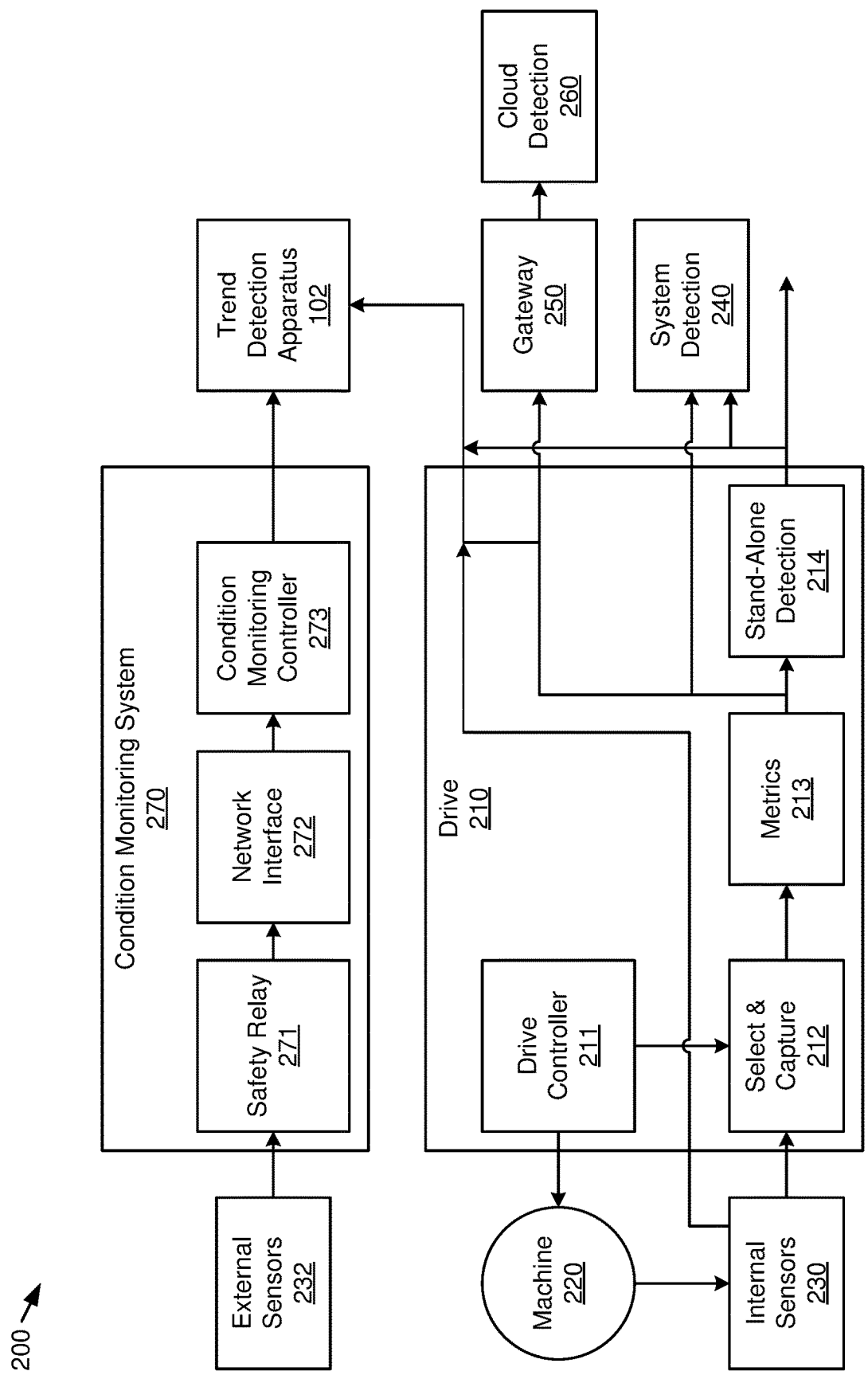
FIG. 2 is a schematic block diagram illustrating a process associated with an embodiment of a lifetime apparatus for aggregating and correlating data from different types of sensors for product lifecycle management.

FIG. 2 is a schematic block diagram illustrating a process 200 associated with an embodiment of a lifetime apparatus 102 for aggregating and correlating data from different types of sensors 150. FIG. 2 depicts an embodiment of how sensor information primarily used for fault analysis can be exported to the lifetime apparatus 102 along with other sensor information from a condition monitoring system 270 for the lifetime apparatus 102 to repurpose the sensor information to identify abnormal conditions.

The process 200 includes a drive 210, and in some embodiments, is representative of a drive 110 of FIG. 1, which may be variable frequency drive and may also include an analytics engine. Components of the drive 210 serve to represent functionality of a drive that includes an analytics engine for device-level condition monitoring. A drive controller 211 provides an output supplied to a machine 220, which may be representative of any machine-driven industrial operation including the industrial operation 120 of FIG. 1. The internal sensors 230 may include vibration, temperature, acoustic, or other external sensors 232 that collect data related to operation of the machine 220 and provide the data to a select and capture module 212.

The select and capture module 212, in some embodiments, collects data from a drive signal or internal sensors 230, depending on what signal is selected, and provides the captured data to a metrics module 213. The select and capture module 212, in some embodiments, is used during baseline and runtime captures, such as at different machine speeds and loading conditions. The metrics module 213 processes the data to generate metrics data that can be utilized for fault detection and prediction by the lifetime apparatus 102. In other embodiments, the internal sensors 230 provide information through the drive 210 to the lifetime apparatus 102.

The data collected by the select and capture module 212 and processing performed by the metrics module 213 may, in some embodiments, depend on settings specific to one or more fault conditions being monitored. For example, for a given fault condition, settings may change which drive signal is selected to capture in the select and capture module 212 as well as the manner in which the metrics module 213 processes the data by changing signal paths to implement various filters and algorithms, performing measurements, utilizing specific parameters, or other settings that may affect processing to produce metrics specific to a fault condition. In some embodiments, metrics are calculated independently for baseline and runtime captures and then differences are calculated between them. Metrics may then be output by the metrics module 213 and provided to one or more systems and modules for condition monitoring, such as to the lifetime apparatus 102.

The output of the metrics module 213 is provided to the stand-alone detection module 214 which may then use the metrics produced by the metrics module 213 to perform fault detection within the drive 210, such as comparing vibration information for a particular machine speed with a vibration signature for the machine speed to identify faults. Stand-alone detection, in some examples, includes determining if one or more fault conditions is present based on the settings specific to at least one fault being monitored. Detection methods include thresholding or machine learning. In addition to supplying the metrics to the stand-alone detection module 214, metrics may be provided to additional systems for condition monitoring or other purposes.

In the present example, metrics are provided to the lifetime apparatus 102 for predicting and detecting abnormal conditions. In a further example, metrics are provided to a system detection module 240 for other system-level fault/failure detection. Metrics, in some embodiments, are also provided to gateway 250 and ultimately to cloud detection module 260 for enterprise-level fault detection. Metrics may also be provided to additional systems or locations. Similarly, stand-alone detection module 214 may provide detection results to one or more external locations including system detection module 240. In some embodiments, the stand-alone detection module 214 may provide results to a gateway 250, a cloud detection module 260, or any other system in communication with the stand-alone detection module 214.

One or more external sensors 232 in the depicted embodiment, such as the external sensors 155 of FIG. 1, provide information to a safety relay 271 of a condition monitoring system 270, such as the safety relay 162 and the external condition monitoring system 160 of FIG. 1. The safety relay 271 provides information to a network interface 272 for transmittal over a computer network to a condition monitoring controller 273, which transmits information to lifetime apparatus 102. In some embodiments, the network interface 272 is similar to the network interface 163 and the condition monitoring controller 273 is similar to the condition monitoring controller 161 of FIG. 1. The network interface 272, in some embodiments, is a network gateway with an IP address. In other embodiments, the external sensors 232 transmit data directly to the condition monitoring controller 273.

Figure 3:
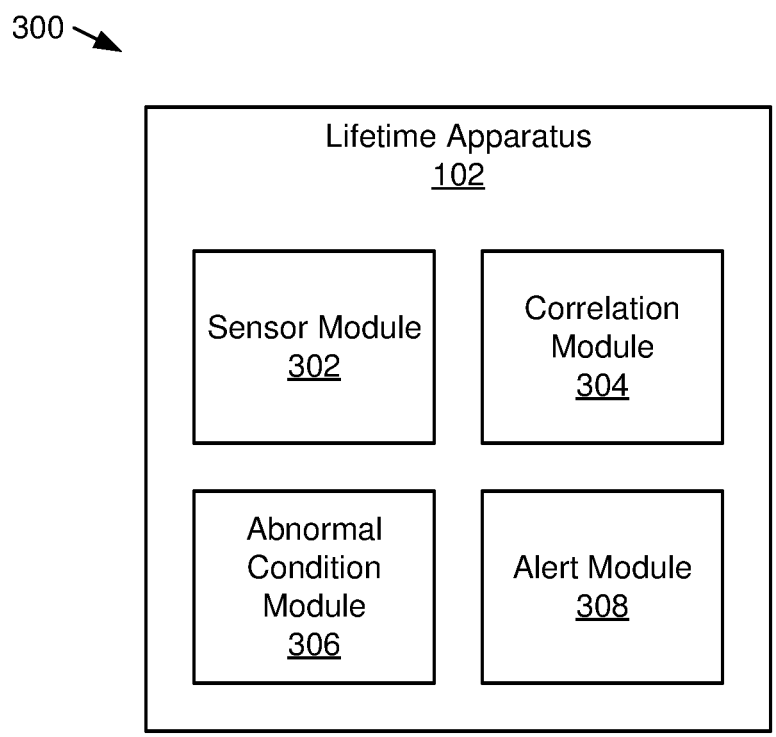
FIG. 3 is a schematic block diagram illustrating one embodiment of an apparatus for aggregating and correlating data from different types of sensors for product lifecycle management.

FIG. 3 is a schematic block diagram illustrating one embodiment of an apparatus 300 for aggregating and correlating data from different types of sensors 150 for product lifecycle management. The apparatus 300 includes one embodiment of the lifetime apparatus 102 that includes a sensor module 302, a correlation module 304, an abnormal condition module 306 and an alert module 308, which are described below. The apparatus 300, in some embodiments, is implemented with program code stored on computer readable storage media, which is non-transitory. The program code is executable by a processor, such as a server executing program code of the system analytics 131. In other embodiments, the apparatus 300 is implemented in a controller. For example, the controller may be in a MCC 112, drive 110 or other device. The controller may include program code and may also be implemented completely or partially with hardware circuits. In some embodiments, the apparatus 300 is implemented completely or partially with a programmable hardware device, such as an FPGA. For example, the apparatus 300 may be implanted as a controller as an FPGA where some elements of the apparatus 300 are implemented with hardware circuits, such as the sensor module 302 that may have some hardware connections to sensors 150. One of skill in the art will recognize other ways to implement the apparatus 300.

The apparatus 300 includes a sensor module 302 configured to receive sensor information from an additional sensor of a plurality of sensors (e.g. 150) of an industrial operation 120. The additional sensor is different from one or more component sensors 150 of the plurality of sensors used for functionality of a component (e.g. 110, 112, 122, 124, 126, etc.) of the industrial operation 120. Sensor information from the additional sensor monitors conditions of a portion of the industrial operation 120 different from sensor information of the one or more component sensors used by the component for the functionality of the component. For example, a piece of equipment 124, such as a conveyor belt, may include internal sensors 154 built into the equipment 124, such as a motion sensor 159, an optical sensor 158, etc. that are used to monitor product on the conveyor belt. An additional sensor may be on or close to the equipment 124, such as a temperature sensor 153, to be able to be correlated with the equipment 124.

In another example, drives 110 may include a current sensor 151, a voltage sensor 152, etc. for operation of the drive 110 and may include other additional sensors, such as a temperature sensor 153, an odor sensor 156, a humidity sensor 157, etc. that may be in the drive 110, a bucket of the MCC 112 containing the drive 110, or within the MCC 112 that are sufficiently related to the drive 110 to be correlated to an operating parameter of the drive 110. One of skill in the art will recognize other component sensors of a component of an industrial operation 120 and additional sensors sufficiently related to the component to be correlated to an operational parameter of the component.

The apparatus 300 includes a correlation module 304 configured to derive, using the sensor information received by the sensor module 302, a correlation between an operational parameter of the component and sensor information of the additional sensor. The operational parameter is related to a predicted operational lifetime of the component. For example, if the component is a rotating machine 122, a humidity sensor 157 may be placed close enough to the rotating machine 122 so that humidity at the rotating machine 122 about the same as the humidity sensed by the humidity sensor. Humidity may affect a predicted operational life of the rotating machine 122. For example, high humidity may cause rust on critical components of the rotating machine 122. An odor sensor 156 or other chemical sensor may be placed by the rotating machine 122 and may detect a corrosive environment that may affect the predicted operational lifetime of the rotating machine 122. Likewise, a temperature sensor 153 may be close enough to detect a temperature of the rotating machine 122 where extreme temperatures may affect the predicted operational lifetime of the rotating machine 122.

The correlation module 304, in some embodiments, is configured to derive the correlation between the additional sensor and the operational parameter of the component by detecting that the additional sensor is close to the component. For example, the correlation module 304 may access location information of the components and sensors of the industrial operation 120. The location information may be input to a database, may be sensed via global positioning satellite ("GPS") information, etc. In other embodiments, the correlation module 304 derives the correlation based on sensor information. For example, the component may be a drive 110 and the additional sensor may be a temperature sensor 153 and the correlation module 304 may correlate sensed current from a current sensor 151 of the drive 110 with an operational parameter of temperature. The correlation module 304 may determine that as current rises in the drive that temperature of the temperature sensor 153 also rises.

In some embodiments, the correlation module 304 correlates sensor information of the additional sensor with an operational parameter by using commands or other data of the component. For example, the correlation module 304 may correlate speed commands sent to a drive 110 with temperature of a temperature sensor 153 where increased speed correlates with increased temperature so that the correlation module 304 correlates sensor information of the temperature sensor 153 with temperature of the drive 110.

The correlation module 304 may also determine various levels of correlation. For example, in an MCC 112, various buckets of the MCC 112 may include temperature sensors 153 and when temperature in one bucket rises, temperature in an adjoining bucket may also rise but a lessor amount. In some embodiments, the correlation module 304 may correlate commanded motor speeds, current levels, etc. of each bucket with the various temperature sensors 153 to determine which bucket correlates closest to a particular temperature sensor 153. Other correlations to additional sensors that are not as tightly correlated may also be useful. In another example, the industrial operation 120 includes equipment 124, pumps 126, rotating machines 122, etc., which are mechanically coupled and various vibration sensors are placed around the mechanically coupled equipment 124, pumps 126, rotating machines 122 and other components. The correlation module 304 correlates various vibration sensors with the components 122, 124, 126 based on sensed vibration information, speed commands, current levels, location information, etc. and correlates an operational parameter of a component with a particular vibration sensor.

Note that while a particular additional sensors may be correlated with particular components and an operational parameter of the component, information used for the correlation, such as temperature may still be affected by surrounding equipment, general environmental conditions, etc. For example, while the correlation module 304 may correlate a particular temperature sensor 153 of a drive 110 with the operational parameter of temperature of the drive 110, temperature of surrounding drives 110 of an MCC 112 may still drive the temperature of the drive 110 to a point where the operational lifetime of the drive 110 is affected. In addition, temperature increases due to general temperature rise within the industrial environment 100 may also cause temperature rise in drives 110.

The apparatus 300 includes an abnormal condition module 306 configured to identify an abnormal operating condition of the component based on a comparison between additional sensor information from the additional sensor and the operational parameter. In some embodiments, the abnormal condition module 306 identifying the abnormal condition includes the abnormal condition module 306 identifying that the sensor information of the additional sensor is above a threshold. For example, a temperature sensor 153 may be correlated by the correlation module 304 with a drive 110, which may have certain temperature limits. The temperature limits may be set by a manufacturer and temperature excursions beyond the temperature limits may degrade the drive 110. The abnormal condition module 306 identifies when the temperature sensed by the correlated temperature sensor 153 is above a temperature limit.

In some embodiments, the operational parameter is scaled based on some factor, such as distance to the component. For example, where a temperature limit of a drive 110 is 210 degrees Celsius ("° C."), due to distance from the component a measured temperature of 200° C. may correlate to 210° C. at the component so the abnormal condition module 306 may use a temperature limit of 200° C. where the actual temperature limit is 210° C. Other operational parameter limits may also be scaled, such as acoustic noise, vibration, etc. based on various factors, such as distance, mechanical coupling, etc.

In some embodiments, the abnormal condition module 306 identifying the abnormal condition includes the abnormal condition module 306 identifying that the sensor information of the additional sensor is trending away from a baseline signature where the baseline signature includes a collection of normal operating points of the additional sensor under various operating conditions. In the embodiments, the abnormal condition module 306 identifies a trend away from the baseline signature. For example, the baseline signature may correlate motor speed with temperature and the abnormal condition module 306 determines that under current motor speed conditions that the temperature sensed by the correlated temperature sensor 153 is too high. The baseline signature and uses with the abnormal condition module 306 are explained in more detail with respect to the apparatus 400 of FIG. 4.

The apparatus 300 includes an alert module 308 configured to send an alert that includes the identified abnormal operating condition. The alert module 308 sends the alert electronically. In some embodiments, the alert includes identification information of the component, a number of spare components to replace the component, a website address for purchase of the component, and/or a link to information about the component. In some embodiments, the alert module 308 sends the alert using a messaging platform such as by email, text message, etc. In some embodiments, the alert module 308 sends the alert to a particular person, such as an equipment operator, plant manager, etc. In other embodiments, the alert module 308 transmits the alert to another application or to an application of the lifetime apparatus 102 to be used for input to another application, webpage, etc. For example, data from the alert may be input to a predicted operational lifetime model for the component. One of skill in the art will recognize other ways to transmit the alert and uses for the information in the alert.

Figure 4:
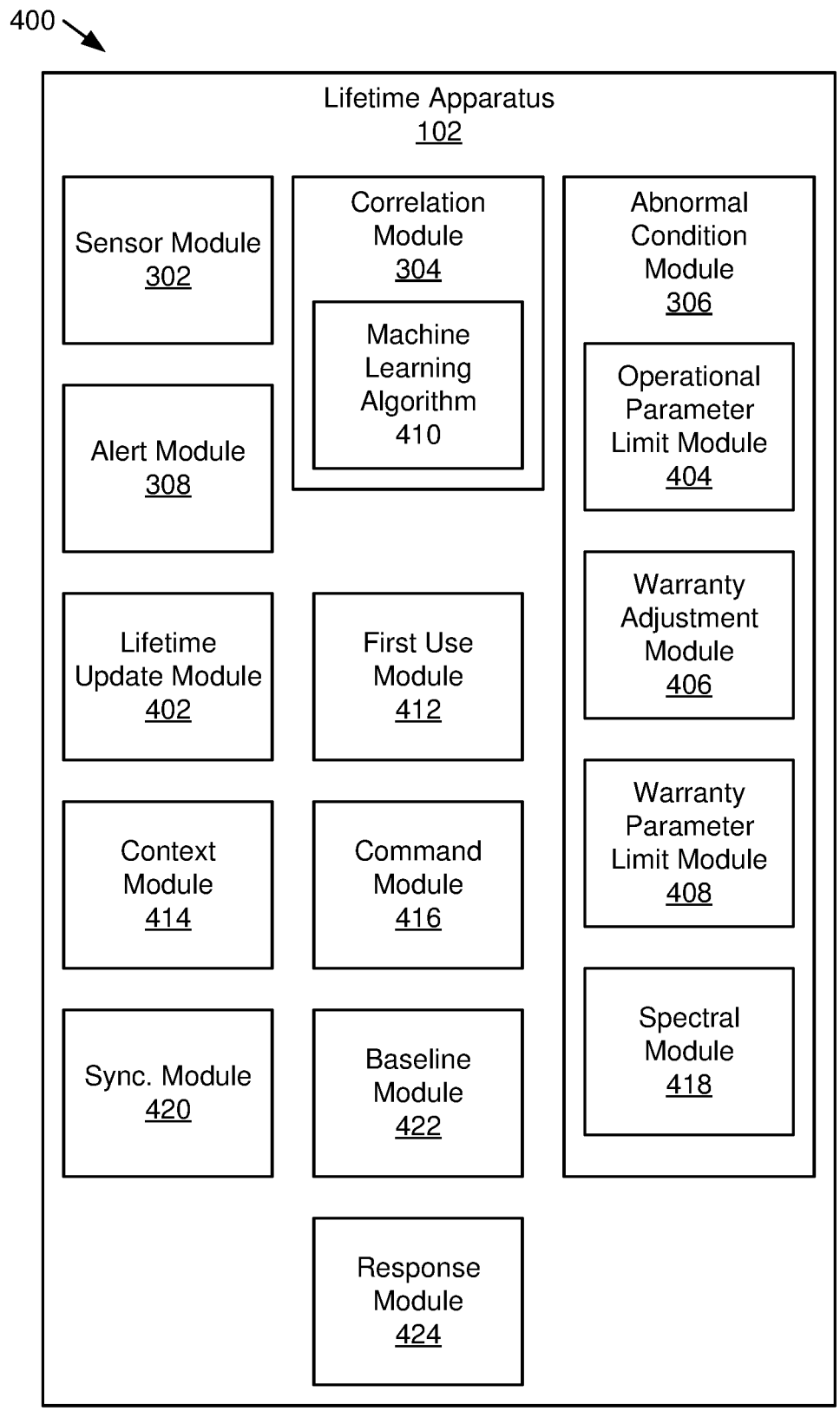
FIG. 4 is a schematic block diagram illustrating another embodiment of an apparatus for aggregating and correlating data from different types of sensors for product lifecycle management.

FIG. 4 is a schematic block diagram illustrating another embodiment of an apparatus 400 for aggregating and correlating data from different types of sensors for product lifecycle management. The apparatus 300 includes another embodiment of the lifetime apparatus 102 that includes a sensor module 302, a correlation module 304, an abnormal condition module 306 and an alert module 308, which are substantially similar to those described above in relation to the apparatus 300 of FIG. 3. In various embodiments, the apparatus 400 includes a lifetime update module 402, the abnormal condition module 306 with an operational parameter limit module 404, a warranty adjustment module 406, a warranty parameter limit module 408 and a spectral module 418, the correlation module 304 with a machine learning algorithm 410, a first use module 412, a context module 414, a command module 416, a synchronization module 420, a baseline module 422 and/or a response module 424, which are described below. The apparatus 400 may be implemented in similar ways as described above for the apparatus 300 of FIG. 3.

In some embodiments, sensor information of the additional sensor beyond an operational parameter limit affects the predicted operational lifetime of the component and the apparatus 400 includes a lifetime update module 402 configured to use sensor information of the additional sensor beyond the operational parameter limit to modify a predicted operational lifetime model of the component. In the embodiments, the apparatus 400 also includes the operational parameter limit module 404 in the abnormal condition module 306 configured to determine, based on the predicted operational lifetime model, that the predicted operational lifetime of the component has reached a lifetime limit.

Often, modeling is used to predict an end-of-life of a component. Often, a curve of the predicted lifetime is derived and is based on various parameters, such as operational cycles, operational time, etc. In some models, probability of failure is relatively high when the component is first used and then is low for a period of time or for a number of operational cycles and then increases dramatically at a particular point. This type of model is sometimes referred to as a "bathtub" model because it has some similarities to a cross section of a bathtub. Typically, a predicted operational lifetime model is based on certain environmental conditions.

Often, the predicted operational lifetime model changes based on changing environmental conditions. For example, sometimes where a component is exposed to excessive heat, the operational lifetime of the component is shortened so that the end-of-life probability of failure starts to increase earlier than if the component was exposed to temperatures closer to nominal temperatures for which the predicted operational lifetime model was derived. Other factors such as vibration, mechanical stress, sunlight, corrosive chemicals, humidity, etc. also affect the operational lifetime of a component.

In some embodiments, sensor information from the additional sensor below an operational parameter limit may be considered normal and may not have a significant effect on the component, but sensor information from the additional sensor beyond this operational parameter limit may be considered to affect the operational lifetime of the component and the lifetime update module 402 uses the sensor information from the additional sensor above the operational parameter limit to update a predicted operational lifetime model for the component. For example, where the operational parameter is temperature, temperatures below a particular operational parameter limit may be considered normal and may not have a significant effect on the component, but temperatures beyond this operational parameter limit may be considered to affect the operational lifetime of the component. When the temperature of the temperature sensor 153 of the component is above the operational parameter limit, the lifetime update module 402 uses the temperature information to modify the predicted operational lifetime model of the component.

Where the sensor information from the additional sensor has a negative effect on the operational lifetime of the component, the sensor information beyond the operational parameter limit reduces the operational lifetime of the component. The lifetime update module 402 modifies the predicted operational lifetime model to increase the probability of failure of the component earlier than the baseline curve in the predicted operational lifetime model. The predicted operational lifetime model is useful in predicting failures of the component before they occur so that typically certain lifetime limits are set prior to predicted failure to allow for replacement of the component before failure. The operational parameter limit module 404 is configured to determine, based on the predicted operational lifetime model as adjusted by the lifetime update module 402, that the predicted operational lifetime of the component has reached a lifetime limit and the alert module 308 then sends an alert indicating reaching the lifetime limit. The lifetime limit may be set hours, days, or weeks before the predicted operational lifetime model predicts a high probability of failure.

In some embodiments, the operational parameter is a warranty parameter of a warranty of the component and the apparatus 400 includes a warranty adjustment module 406 configured to identify that the sensor information from the additional sensor is beyond a warranty limit of the warranty parameter. Typically, components remain under warranty for a period of time but warranties often include conditions and limits on how the component is operated and the environment in which the component is operating. A warranty may include limits on maximum and minimum temperature, mechanical stresses such as shock and vibration, maximum and/or minimum humidity, current limits, voltage limits, environmental constraints such as limits on chemicals in the air around the component, and the like. The warranty parameter may be any operational parameter that is monitored by a sensor that provides information helpful in determining if a warranty limit has been exceeded. Thus, the embodiments described herein may be used to identify an additional sensor that is correlated to a warranty parameter of the component so that the warranty adjustment module 406 in the abnormal condition module 306 is able to identify an abnormal operating condition where a limit on a warranty parameter is exceeded.

For example, the warranty parameter may be temperature where a warranty for the component has a temperature limit. Once the correlation module 304 has correlated a temperature sensor 153 with the component, the abnormal condition module 306 compares sensor information from the temperature sensor 153 with the temperature limit and when the sensor information exceeds the temperature limit, the warranty adjustment module 406 of the abnormal condition module 306 determines that there is an abnormal operating condition and the alert module 308 sends an alert with information about the sensor information of the temperature sensor 153 exceeding the temperature limit of the warranty of the component. The alert module 308 may send the alert to a plant operator, to the manufacturer, to a file with warranty tracking information, etc.

In some embodiments, the operational parameter affects a warranty parameter of a warranty of the component where the warranty parameter is associated with sensor information of a component sensor of the plurality of sensors 150. In the embodiment, the apparatus 400 includes a warranty parameter limit module 408 and identifying the abnormal operating condition of the component includes the abnormal condition module 306 determining that the sensor information from the additional sensor is beyond an operational parameter limit of the operational parameter and in response, the warranty parameter limit module 408 is configured to adjust a warranty parameter limit of the warranty parameter and determine that sensor information of the component sensor is beyond the adjusted warranty parameter limit.

For example, the additional sensor may be a temperature sensor 153 and the operational parameter may be temperature. The abnormal condition module 306 determines if the temperature sensor 153 is beyond a temperature limit, which may affect the operational lifetime of the component. The warranty parameter limit module 408 adjusts a warranty parameter limit, such as number of operational cycles, an amount of watt-hours, time in use, or some other metric tracked by a component sensor and related to determining if the component has reached a warranty parameter limit. The component sensor may track operational cycles and if an initial warranty parameter limit is 100,000 cycles, increased temperature may then result in the warranty parameter limit module 408 to lower the warranty parameter limit to 80,000 cycles. When the warranty parameter limit module 408 detects that the number of operational cycles of the component has exceeded the warranty parameter limit of 80,000 cycles, the alert module 308 transmits and alert indicating that the component has exceeded the shortened warranty parameter limit of 80,000 cycles, which may indicate that the component is no longer under warranty.

In some embodiments, the abnormal condition module 306 tracks how long the sensor information of the additional sensor exceeds the operational parameter limit and/or tracks how much past the operational parameter limit the sensor information has gone and the warranty parameter limit module 408 adjusts the warranty parameter limit accordingly. For example, where the sensor information of the additional sensor is beyond a temperature limit for a long time, the warranty parameter limit module 408 adjusts the warranty parameter limit more than a short temperature excursion beyond the temperature limit. In addition, a temperature much higher than the temperature limit results in a greater adjustment by the warranty parameter limit module 408 than a temperature a little beyond the temperature limit.

In some embodiments, the warranty parameter limit module 408 uses a combination of time and amount past the operational parameter limit to adjust the warranty parameter limit. For example, the warranty parameter limit module 408 may use area between the operational parameter limit and sensor data to determine an amount to adjust the warranty parameter limit, for example, by using an integral function. One of skill in the art will recognize other ways for the warranty parameter limit module 408 to make adjustments to a warranty parameter limit. As an example, the component may be a contactor that includes sensors connected via a subnet layer. The contactor may include a current sensor 151 but additional sensors that are current sensors 151 may be correlated to an inrush current warranty parameter limit and the warranty parameter limit module 408 may be used to determine a total amount of current being added while adding components and is able to detect a violation of the inrush current warranty parameter limit or to identify an abnormal operating condition prior to an inrush current event that would violate the inrush current warranty parameter limit.

The apparatus 400, in some embodiments, includes a machine learning algorithm 410 in the correlation module 304 configured to identify the correlation from sensor information of a plurality of additional sensors monitoring conditions of a portion of the industrial operation 120 different from the functionality of the component. For example, the machine learning algorithm 410 may be used to identify over time how close an additional sensor must be to be affected by operation of the component. In other examples, the machine learning algorithm 410 identifies trends within a group of components that are close together and correlates that trends with component operations. For example, the machine learning algorithm 410 may correlate a specific additional sensor with a particular component when there are several components close by and other additional sensors and/or component sensors of those other components that may be classified as additional sensors to the component that is the focus of the machine learning algorithm 410.

In some embodiments, the machine learning algorithm 410 is a deep neural network with sensor information of the sensors 150 as input. Other inputs to the deep neural network may be system commands or other system data that help to define operating conditions. One of skill in the art will recognize other ways that a machine learning algorithm 410 may be used by the apparatus 400 to derive correlations, a baseline signature, abnormal conditions, etc.

In some embodiments, the apparatus 400 includes a first use module 412 configured to identify a first use of the component from sensor information of the one or more component sensors and/or the additional sensor. Identifying a first use may be used to start a warranty period of the component. In other embodiments, the first use module 412 identifying a first use may be used in conjunction with the warranty adjustment module 406 and/or the warranty parameter limit module 408. One of skill in the art will recognize other uses for identifying the first use of a component.

The apparatus 400, in some embodiments, includes a context module 414 configured to identify, using sensor information from the additional sensor and/or sensor information from the one or more component sensors, one or more operational contexts of the component. The abnormal condition module 306 identifying the abnormal operating condition of the component also includes identifying an abnormal operating condition of the component using a current operational context of the component and the comparison between the additional sensor information from the additional sensor and the operational parameter.

In some embodiments, the contexts include different operational scenarios, different operating conditions, etc. and may overlap. For example, a context may include a certain manufacturing mode. For instance, one context may include manufacturing a product with a certain type of part or ingredient where another context may include manufacturing the product with different parts and/or ingredients or even manufacturing a different product. In other embodiments, the contexts may include different loading conditions, different machine speeds, etc. In other embodiments, the contexts may include different shifts or operational periods in a day or week. In other embodiments, the contexts include different weather conditions, different seasons, etc.

In some embodiments, certain operating conditions are present for each context and the different contexts may be included in the baseline signature. Each context may be correlated with certain sensor information or ranges of sensor information. The abnormal condition module 306 identifying an abnormal operating condition may then include determining that a trend is out of context. One of skill in the art will recognize other ways that contexts identified by the context module 414 are useful in determining deriving correlations, deriving a baseline signature and/or identifying an abnormal condition.

In some embodiments, the apparatus 400 includes a command module 416 configured to receive commands that may be used by the correlation module 304 and/or the machine learning algorithm 410 along with other sensor information to derive a correlation between an operational parameter and sensor information of the additional sensor. In some embodiments, command information may be used in a similar way as sensor information. In other embodiments, the abnormal condition module 306 and/or other modules described herein use command information from the command module 416. One of skill in the art will recognize other ways that command information from the command module 416 may be used.

The apparatus 400, in some embodiments, includes a spectral module 418 in the abnormal condition module 306 identifies a spectral composition of the sensor information received by the sensor module 302 from the additional sensor and/or the one or more component sensors and the abnormal condition module 306 identifies the abnormal operating condition based on a comparison between a particular frequency range of the additional sensor information from the additional sensor and a corresponding frequency range of the operational parameter.

For example, sensor information may be from a vibration sensor and/or an acoustic sensor used to measure vibration and the operational parameter may include one or more spectral ranges or other spectral limits so that the spectral module 418 works with the abnormal condition module 306 to determine an abnormal operating condition using the spectral information. For example, certain vibrations in a particular frequency range may be expected and normal while other vibrations in other frequency ranges or a particular vibration signature may be associated with an abnormal operating range indicative of a reduced operational lifetime of a component.

In some embodiments, the apparatus 400 includes a synchronization module 420 configured to synchronize sensor information from two or more of the plurality of sensors 150. In some embodiments, the synchronization module 420 uses timestamp information from sensor information to synchronize the sensor information of two or more of the plurality of sensors 150. In other embodiments, the synchronization module 420 uses known time delays of sensor information transmission to synchronize the sensor information. In other embodiments, the synchronization module 420 uses contextual information of operation of the components to synchronize sensor information. One of skill in the art will recognize other ways for the synchronization module 420 to synchronize sensor information from two or more of the plurality of sensors 150.

In some embodiments, the apparatus 400 includes a baseline module 422 configured to derive a baseline signature for one or more sensors of the plurality of sensors 150. The baseline signature encompasses a range of normal operating conditions. The baseline signature, in some embodiments, includes sensor information data points for various operating conditions. For example, the baseline signature may include data for various loading conditions of equipment 124, various speeds and loading conditions of rotating machines, various speeds, flow rates, pressure, etc. for pumps 126, etc. In some embodiments, the baseline module 422 interpolates between operating points to further define a baseline signature. In other embodiments, as additional sensor information is gathered, the baseline module 422 adjusts interpolated data to accommodate the new sensor information.

In some embodiments, for various operating points the correlation module 304 additionally derives correlations between various component sensors and/or additional sensors and includes a range in the baseline signature for one or more sensors. In other embodiments, the correlation module 304 uses various data points of the signature information of a particular sensor to derive a representative data point for the baseline signature, for example by averaging data points of the signature information for a particular sensor. One of skill in the art will recognize other ways to statistically derive a data point for a sensor to be used in the baseline signature for a particular operating condition.

The baseline module 422, in various embodiments, derives the baseline signature in various forms. For example, the baseline signature may be a database, a table, a matrix, or other suitable data structure. In some embodiments, the baseline module 422 derives the baseline signature to include one or more equations to represent various operating conditions. The baseline module 422, in various embodiments, uses curve fitting or other similar technique to derive the equations for the baseline signature. The abnormal condition module 306, in some embodiments, uses the baseline signature to identify trends or other excursions beyond the baseline signature to identify an abnormal operating condition. One of skill in the art will recognize other uses for the baseline signature in conjunction with embodiments described herein.

In some embodiments, the apparatus 400 includes a response module 424 configured to respond to the alert from the alert module 308. In some embodiments, the response module 424 responds by identifying a replacement component, a location of a replacement component, a website with information about the replacement component, etc. In other embodiments, the response module 424 takes action to reduce damage to the component or to prolong the operational lifetime of the component. For example, the response module 424 may reduce a motor speed, may reduce throughput of a conveyor, may reduce a load on a machine 122, or the like. One of skill in the art will recognize other ways for the response module 424 to respond to the alert.

Figure 5:
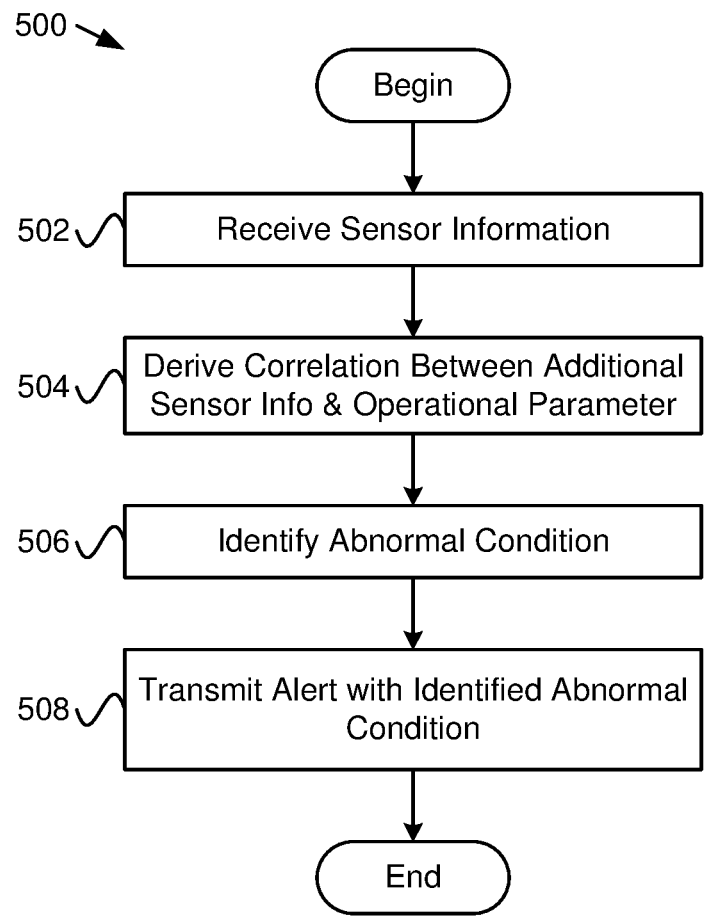
FIG. 5 is a flowchart diagram of one embodiment illustrating a method for aggregating and correlating data from different types of sensors for product lifecycle management.

FIG. 5 is a flowchart diagram of one embodiment illustrating a method 500 for aggregating and correlating data from different types of sensors 150 for product lifecycle management. The method 500 begins and receives 502 sensor information from an additional sensor of a plurality of sensors 150 of an industrial operation 120. The additional sensor is different from one or more component sensors of the plurality of sensors 150 used for functionality of a component of the industrial operation 120. Sensor information from the additional sensor monitors conditions of a portion of the industrial operation 120 different from sensor information of the one or more component sensors used by the component for the functionality of the component. The method 500 derives 504, using the sensor information, a correlation between an operational parameter of the component and sensor information of the additional sensor. The operational parameter is related to a predicted operational lifetime of the component.

The method 500 identifies 506 an abnormal operating condition of the component based on a comparison between additional sensor information from the additional sensor and the operational parameter and sends 508 an alert that includes the identified abnormal operating condition, and the method 500 ends. In various embodiments, all or a portion of the method 500 is implemented using one or more of the sensor module 302, the correlation module 304, the abnormal condition module 306 and the alert module 308.

Figure 6A:
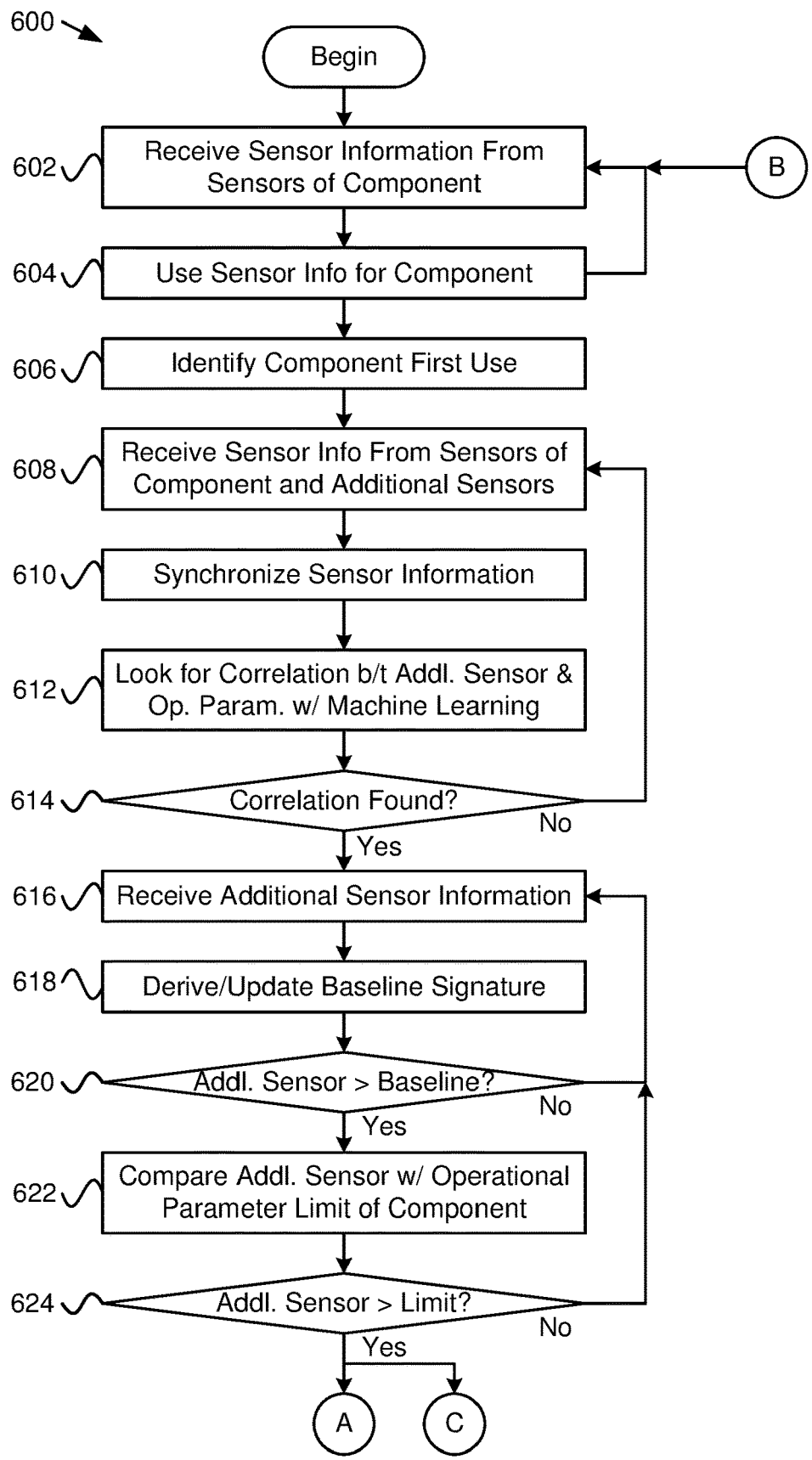
FIG. 6A is a first part of a flowchart diagram of another embodiment illustrating a method for aggregating and correlating data from different types of sensors for product lifecycle management.
Figure 6B:
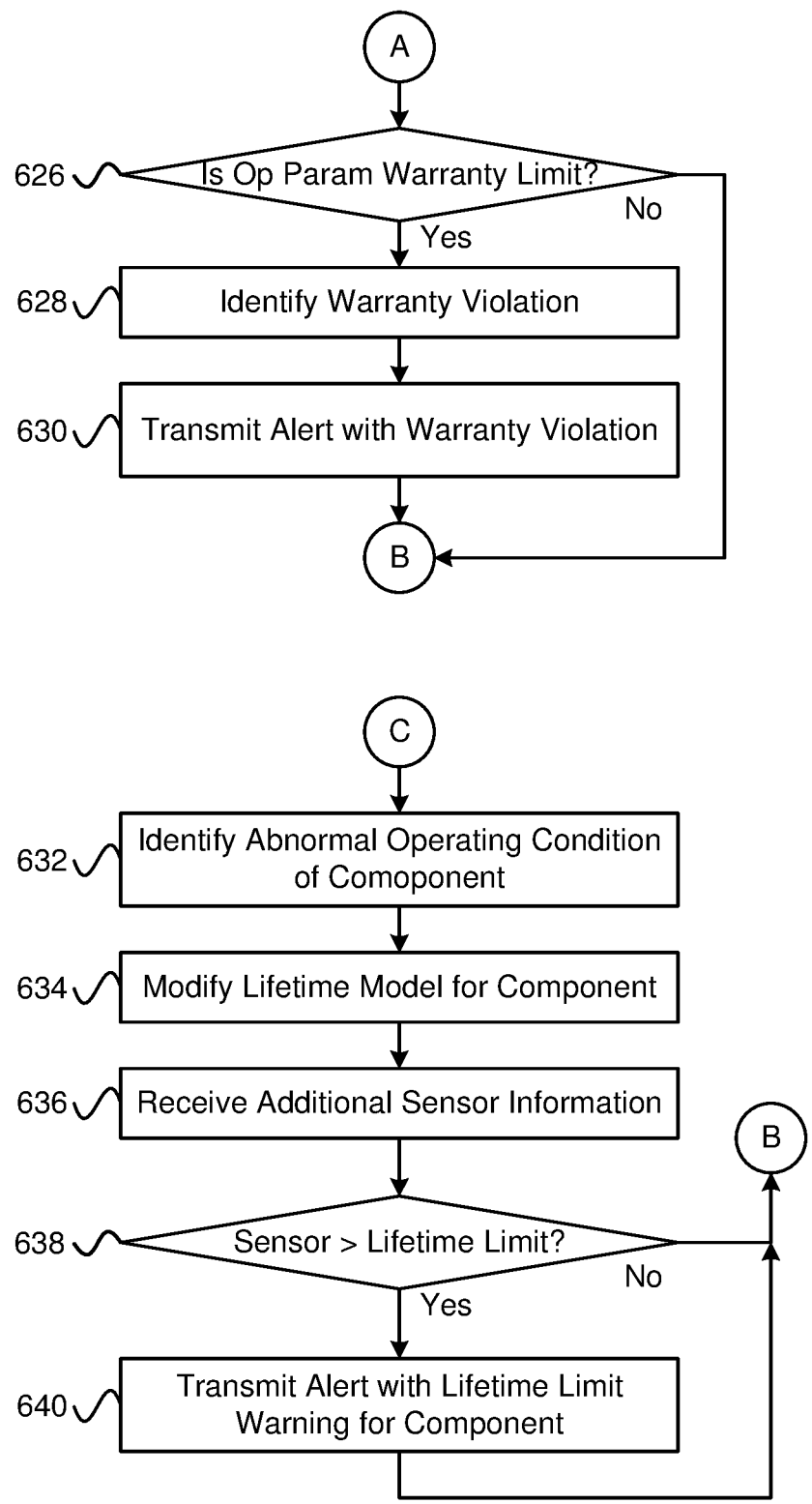
FIG. 6B is a second part of a flowchart diagram of the embodiment of FIG. 6A.

FIG. 6A is a first part and FIG. 6B is a second part of a flowchart diagram of another embodiment illustrating a method 600 for aggregating and correlating data from different types of sensors 150 for product lifecycle management. The method 600 begins and receives 602 sensor information from component sensors of a component of an industrial operation 120. The component sensors are of a plurality of sensors 150 of the industrial operation 120. The method 600 uses 604 the sensor information of the component sensors for functionality of the component. The method 600 continually receives 602 the component sensor information and uses 604 the component sensor information for functionality of the component.

The method 600 identifies 606 a first use of the component from the sensor information of the component sensors, which may be used to start a warranty, to adjust a predicted operational lifetime model of the component, etc. The method 500 identifies 606 the first use of the component only on the first pass through the flowchart. The method 600 receives 608 additional sensor information from the component sensors and sensor information from additional sensors of the plurality of sensors 150 of the industrial operation 120. The additional sensors are different from the component sensors used for functionality of the component. Sensor information from the additional sensors monitor conditions of one or more portions of the industrial operation 120 different from sensor information of the one or more component sensors used by the component for the functionality of the component.

The method 600 synchronizes 610 sensor information from the plurality of sensors 150 and looks 612 for correlation between an additional sensor and an operational parameter of the component and determines 614 if a correlation is found. If the method 600 determines that a correlation is not found, the method 600 returns and receives 608 additional sensor information. If the method 600 determines that a correlation exists between an additional sensor and the operating parameter of the component, the method 600 receives additional sensor information from the additional sensor and derives 618 or updates 618 a baseline signature for the additional sensor.

The method 600 determines 620 if sensor information from the additional sensor exceeds the baseline signature. If the method 600 determines 620 that the sensor information from the additional sensor does not exceed the baseline signature, the method 600 returns and receives 616 additional sensor information. If the method 600 determines 620 that the sensor information from the additional sensor exceeds the baseline signature, the method 600 compares 622 the sensor information with an operational parameter limit of the component and determines 624 if the sensor information of the additional sensor exceeds the operational parameter limit. If the method 600 determines that the sensor information from the additional sensor does not exceed the operational parameter limit, the method 600 returns and receives 616 additional sensor information.

If the method 600 determines 624 that the sensor information from the additional sensor exceeds the operational parameter limit, the method 600 determines 626 if the operational parameter limit is a warranty limit (follow "A" on FIG. 6A to "A" on FIG. 6B). If the method 600 determines 626 that the operational parameter limit is a warranty limit, the method 600 identifies 628 a warranty violation and transmits 630 an alert with the warranty violation and returns and receives 602 component sensor information (follow "B" on FIG. 6B to "B" on FIG. 6A). If the method 600 determines 626 that the operational parameter limit is not a warranty limit, the method 600, the method 600 returns and receives 602 component sensor information (follow "B" on FIG. 6B to "B" on FIG. 6A).

After determining 624 that the sensor information from the additional sensor exceeds the operational parameter limit, the method 600 also identifies 632 an abnormal operating condition of the component (follow "C" on FIG. 6A to "C" on FIG. 6B) and modifies 634 a predicted operational lifetime model for the component. For example, the additional sensor may be a temperature sensor 153 that affects the operational lifetime of the component so the method 600 uses temperature information from the temperature sensor 153 to modify the predicted operational lifetime model.

The method 600 receives 636 additional sensor information where the sensor information is used by the predicted operational lifetime model to determine a current status on a curve of the predicted operational lifetime model. The method 600 determines 638 if the sensor information exceeds a lifetime limit. If the method 600 determines 638 that sensor information does not exceed the lifetime limit, the method 600 returns and receives 602 component sensor information (follow "B" on FIG. 6B to "B" on FIG. 6A). Note that the method 600 continuously receives 636 additional sensor information where the sensor information is used by the predicted operational lifetime model to determine a current status on a curve of the predicted operational lifetime model and determines 638 if the sensor information exceeds a lifetime limit with or without the method 600 modifying 634 the predicted operational lifetime model.

If the method 600 determines 638 that the sensor information exceeds a lifetime limit, the method 600 transmits 640 an alert with a lifetime limit warning for the component and the method 600 returns and receives 602 component sensor information (follow "B" on FIG. 6B to "B" on FIG. 6A). In various embodiments, all or a portion of the method 500 is implemented using one or more of the sensor module 302, the correlation module 304, the abnormal condition module 306, the alert module 308, the lifetime update module 402, the operational parameter limit module 404, the warranty adjustment module 406, the warranty parameter limit module 408, the spectral module 418, the machine learning algorithm 410, the first use module 412, the context module 414, the command module 416, the synchronization module 420, the baseline module 422, and a response module 424.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    receiving sensor information from an additional sensor of a plurality of sensors of an industrial operation, the additional sensor different from one or more component sensors of the plurality of sensors used for functionality of a component of the industrial operation, wherein sensor information from the additional sensor monitors conditions of a portion of the industrial operation different from sensor information of the one or more component sensors used by the component for the functionality of the component;
    deriving, using the sensor information, a correlation between an operational parameter of the component and sensor information of the additional sensor, the operational parameter related to a predicted operational lifetime of the component, wherein deriving the correlation between the operational parameter of the component and sensor information of the additional sensor comprises using a machine learning algorithm to identify the correlation from sensor information of a plurality of additional sensors monitoring conditions of a portion of the industrial operation different from the functionality of the component;
    identifying an abnormal operating condition of the component based on a comparison between additional sensor information from the additional sensor and the operational parameter; and
    sending an alert comprising the identified abnormal operating condition.

2. The method of claim 1, wherein sensor information of the additional sensor beyond an operational parameter limit affects the predicted operational lifetime of the component and further comprising using sensor information of the additional sensor beyond the operational parameter limit to modify a predicted operational lifetime model of the component and wherein identifying the abnormal operating condition comprises determining, based on the predicted operational lifetime model, that the predicted operational lifetime of the component has reached a lifetime limit.

3. The method of claim 2, wherein the lifetime limit comprises a point on the predicted operational lifetime model prior to a predicted failure.

4. The method of claim 1, wherein the operational parameter is a warranty parameter of a warranty of the component and identifying the abnormal operating condition of the component comprises identifying that the sensor information from the additional sensor is beyond a warranty limit of the warranty parameter.

5. The method of claim 1, wherein:
    the operational parameter affects a warranty parameter of a warranty of the component, the warranty parameter associated with sensor information of a component sensor of the plurality of sensors; and
    identifying the abnormal operating condition of the component comprises:
        determining that the sensor information from the additional sensor is beyond an operational parameter limit of the operational parameter;
        adjusting a warranty parameter limit of the warranty parameter in response to determining that the sensor information from the additional sensor is beyond an operational parameter limit of the operational parameter; and
        determining that sensor information of the component sensor is beyond the adjusted warranty parameter limit.

6. The method of claim 1, wherein deriving the correlation between the operational parameter of the component and sensor information of the additional sensor comprises determining that variation of the sensor information of the additional sensor affects the predicted operational lifetime of the component.

7. The method of claim 1, further comprising identifying a first use of the component from sensor information of the one or more component sensors and/or the additional sensor.

8. The method of claim 7, further comprising using the identified first use of the component to adjust the predicted operational lifetime of the component.

9. The method of claim 1, further comprising identifying, using sensor information from the additional sensor and/or sensor information from the one or more component sensors, one or more operational contexts of the component and wherein identifying the abnormal operating condition of the component further comprises identifying an abnormal operating condition of the component using a current operational context of the component and the comparison between the additional sensor information from the additional sensor and the operational parameter.

10. The method of claim 1, further comprising:
    deriving a baseline signature from sensor information of the plurality of sensors, the baseline signature encompassing a range of normal operating conditions,
    wherein identifying the abnormal operating condition of the component based on the comparison between the additional sensor information from the additional sensor and the operational parameter is in response to determining that the additional sensor information from the additional sensor has exceeded the baseline signature.

11. The method of claim 1, wherein sensor information from the additional sensor and/or the one or more component sensors comprises identifying a spectral composition of the sensor information and wherein identifying the abnormal operating condition of the component based on the comparison between the additional sensor information from the additional sensor and the operational parameter comprises identifying the abnormal operating condition based on a comparison between a particular frequency range of the additional sensor information from the additional sensor and a corresponding frequency range of the operational parameter.

12. The method of claim 1, wherein the plurality of sensors sense one or more of temperature, vibration, current, voltage, motion, acoustic noise, strain, movement, odor, pressure, number of uses of the component, magnetic flux, electromagnetic interference, pH, chemical content in air around the component, and/or humidity.

13. The method of claim 1, wherein the alert further comprises identification information of the component, a number of spare components to replace the component, a website address for purchase of the component, and/or a link to information about the component.

14. A system comprising:
a plurality of sensors of an industrial operation, wherein one or more component sensors of the plurality of sensors provide sensor information for functionality of a component of the industrial operation and an additional sensor of the plurality of sensors provides sensor information to monitor conditions of a portion of the industrial operation different from sensor information of the one or more component sensors used by the component for the functionality of the component;
a sensor module configured to receive sensor information from the plurality of sensors;
a correlation module configured to derive, using the sensor information, a correlation between an operational parameter of the component and sensor information of the additional sensor, the operational parameter related to a predicted operational lifetime of the component, wherein deriving the correlation between the operational parameter of the component and sensor information of the additional sensor comprises using a machine learning algorithm to identify the correlation from sensor information of a plurality of additional sensors monitoring conditions of a portion of the industrial operation different from the functionality of the component;
an abnormal condition module configured to identify an abnormal operating condition of the component based on a comparison between additional sensor information from the additional sensor and the operational parameter; and an alert module configured to send an alert comprising the identified abnormal operating condition,
wherein said modules comprise one or more of hardware circuits, a programmable hardware device and executable code, the executable code stored on one or more computer readable storage media.

15. The system of claim 14, wherein sensor information of the additional sensor beyond an operational parameter limit affects the predicted operational lifetime of the component and further comprising using sensor information of the additional sensor beyond the operational parameter limit to modify a predicted operational lifetime model of the component and wherein the abnormal condition module identifying the abnormal operating condition comprises determining, based on the predicted operational lifetime model, that the predicted operational lifetime of the component has reached a lifetime limit.

16. The system of claim 14, wherein the operational parameter is a warranty parameter of a warranty of the component and identifying the abnormal operating condition of the component comprises identifying that the sensor information from the additional sensor is beyond a warranty limit of the warranty parameter.

17. The system of claim 14, further comprising a first use module configured to identify a first use of the component from sensor information of the component sensors and/or the additional sensor.

18. A computer program product comprising a computer readable storage medium having program code embodied therein, the program code executable by a processor to:
receive sensor information from an additional sensor of a plurality of sensors of an industrial operation, the additional sensor different from one or more component sensors of the plurality of sensors used for functionality of a component of the industrial operation, wherein sensor information from the additional sensor monitors conditions of a portion of the industrial operation different from sensor information of the one or more component sensors used by the component for the functionality of the component;
derive, using the sensor information, a correlation between an operational parameter of the component and sensor information of the additional sensor, the operational parameter related to a predicted operational lifetime of the component, wherein deriving the correlation between the operational parameter of the component and sensor information of the additional sensor comprises using a machine learning algorithm to identify the correlation from sensor information of a plurality of additional sensors monitoring conditions of a portion of the industrial operation different from the functionality of the component;
identify an abnormal operating condition of the component based on a comparison between additional sensor information from the additional sensor and the operational parameter; and
send an alert comprising the identified abnormal operating condition.

* * * * *